United States Patent [19]

Morishita et al.

[11] Patent Number: 5,031,989
[45] Date of Patent: Jul. 16, 1991

[54] OPTICAL FILTER COUPLER

[75] Inventors: Katsumi Morishita, Neyagawa; Toshiharu Takesue, Tokyo, both of Japan

[73] Assignees: Osaka Electric and Communication University; Seiko Instruments Inc., both of Japan

[21] Appl. No.: 245,467

[22] Filed: Sep. 16, 1988

[30] Foreign Application Priority Data

Sep. 16, 1987 [JP] Japan .................. 62-231883

[51] Int. Cl.$^5$ .............................................. G02B 6/26
[52] U.S. Cl. ................................................ 350/96.15
[58] Field of Search ............... 350/96.13, 96.15, 96.16, 350/96.29, 96.33, 96.34

[56] References Cited

U.S. PATENT DOCUMENTS

| | | | |
|---|---|---|---|
| 4,490,163 | 12/1984 | Jochem et al. | 350/96.15 |
| 4,533,238 | 11/1985 | Shaw et al. | 350/96.15 |
| 4,546,476 | 10/1985 | Shaw et al. | 350/96.15 |
| 4,632,513 | 12/1986 | Stowe et al. | 350/96.15 X |
| 4,673,270 | 6/1987 | Gordon | 350/96.15 |
| 4,755,037 | 7/1988 | Bjornlie et al. | 350/96.15 |
| 4,805,975 | 2/1989 | Utaka et al. | 350/96.13 |
| 4,846,540 | 7/1989 | Kapon | 350/96.12 |
| 4,861,127 | 8/1989 | Failes | 350/96.15 |
| 4,900,119 | 2/1990 | Hill et al. | 350/96.15 |

FOREIGN PATENT DOCUMENTS

| | | |
|---|---|---|
| 0037793 | 10/1981 | European Pat. Off. . |
| 2506954 | 12/1982 | France . |
| 63-71826 | 4/1988 | Japan .................. 350/96.13 |

OTHER PUBLICATIONS

Katsumi Morishita; "Wavelength Selective Optical-Fibers Directional Couplers Using Dispersive Materials"; Optics Letters, vol. 13, pp. 158-160; Feb. 1988.

Frequenz, vol. 37, No. 9, Sep. 1983, pp. 226-231, Berlin, Germany, article by T. Schwander et al., "Computer-Aided Manufacturing of Graded-Index Fibre Couplers for Bidirectional Communication Links".

*Primary Examiner*—Frank Gonzalez
*Assistant Examiner*—John Ngo
*Attorney, Agent, or Firm*—Bruce L. Adams; Van C. Wilks

[57] ABSTRACT

An optical filter-coupler comprises at least two optical waveguides such as optical fibers closely spaced apart to each other for allowing light propagating in one waveguide to couple into the other. Materials for the waveguides are selected to have different wavelength-dispersive refractive indexes so that the waveguides have a common refractive index at a selected wavelength, whereby a complete power transfer is obtained at such selected wavelength.

19 Claims, 3 Drawing Sheets

OPTICAL FILTER COUPLER

BACKGROUND OF THE INVENTION

1. Field of the Invention

The present invention relates to optical transmission and optical measurements, particularly to an optical filter-coupler which uses optical fibers or other types of waveguides for propagating optical radiation.

2. Prior Art

In conventional optical filter-couplers, the same material is used for closely placed optical fibers or waveguides.

The splitting ratio of an optical filter-coupler is defined by a function of the coupling coefficient, the difference in the propagation constant between cores or waveguides of the optical filter-coupler, and the coupling length. If the coupling coefficient is C, a half of the difference in the propagation constant is $\Delta$, and a coupling length from the start of coupling is Z, the splitting ratio R, which represents how much of the light entering an incident port 1 of an optical coupler, such as shown in FIG. 1, couples from a core 3 thereof to another closely placed core 4, is given by a logarithm of the ratio of light intensities in the cores 3 and 4, $P_b/P_a$, as follows:

$$R = 10 \log \frac{P_b}{P_a} \qquad (1)$$
$$= 10 \log \frac{C^2 \sin^2 \beta c Z}{\Delta^2 + (C \cos \beta c Z)^2}$$

where $\beta c = \sqrt{C^2 + \Delta^2}$

Conventionally, closely placed waveguides are made of the same material, therefore the difference in propagation constant between the waveguides should theoretically be zero (0). But practically such difference in propagation constant can not be reduced to zero. This is because the closely placed cores or waveguides can not be manufactured in precisely the same diameter, consequently a slight difference in the propagation constant between the waveguides occurs. Therefore the maximum splitting ratio in such filter-couplers is given by:

$$R\max = 10 \log \frac{C^2}{\Delta^2} \qquad (2)$$

As shown in FIG. 2, the splitting ratio is thus governed by a periodic function of the coupling length, and therefore a major part of the power of the propagating optical radiation such as light transfers from one core to the other at a coupling length $$Z = \frac{\pi}{2\beta c} \times n$$

(n is an integer).

Recently, there are demands in the field of multiple wavelengths transmission for wavelength filters which perfectly separate a designated wavelength. However, for example, when light of a wavelength A or light of a wavelength B as shown in FIG. 3 are desired to be completely separated, as can be calculated from the equation (2), the splitting ratio R which can be obtained by a conventional filter-coupler only reaches finite levels as shown in FIG. 3 due to the difference in propagation constant between waveguides. In other words, a complete power transfer can not be obtained by use of a conventional filter-coupler which uses the same material for its waveguide portions. Further, it is extremely difficult to manufacture an optical waveguide coupler having its maximum splitting ratios at two different wavelengths because slight changes in coupling length cause large changes in the splitting ratio.

SUMMARY OF THE INVENTION

An object of the invention is therefore to solve the above-mentioned problems by providing an optical filter-coupler which is composed of two or more optical fibers such as single-mode optical fibers, multi-mode optical fibers, or other types of waveguides. The cores of the optical fibers or waveguides are made of materials having a common refractive index at a selected wavelength and also having different chromatic refractive indexes. As known in the art, the term "chromatic refractive index" refers to a refractive index characteristic that varies with wavelength. The term "chromatic refractive index" is synonomous with "wavelength-dispersive refractive index" and both terms are used interchangeably herein.

The use of materials having different wavelength-dispersive refractive indexes for closely placed waveguides results in a difference in the propagation constant. Therefore, the splitting ratio is given by the aforementioned equation (1) as:

$$R = 10 \log \frac{C^2 \sin^2 \beta c Z}{\Delta^2 + (C \cos \beta c Z)^2}$$

where C is the coupling coefficient, $\Delta$ is a half of the difference in the propagation constant between the two waveguides, Z is a coupling length from the start of coupling, and $\beta c = \sqrt{C^2 \times \Delta^2}$.

As described above, the maximum splitting ratio Rmax is given as $R\max = 10 \log C^2/\Delta^2$. However, in this case, the material of one of the cores and that of the other have a common refractive index at a selected wavelength, thus there is no difference in the propagation constant between the two cores at this wavelength, and $\Delta$ is zero (0).

If a coupling length Z is so selected that the maximum splitting ratio is obtained at this wavelength, since the more a given wavelength shifts from this wavelength, the more $\Delta$ differs from zero (0) and the coupling coefficient becomes small, the splitting ratio R drastically diminishes. By using the features as described above, it is easy to manufacture filter-couplers which have a peak coupling power at a selected wavelength in a range of a selected bandwidth.

DETAILED DESCRIPTION OF THE PREFERRED EMBODIMENTS

Figure 1:
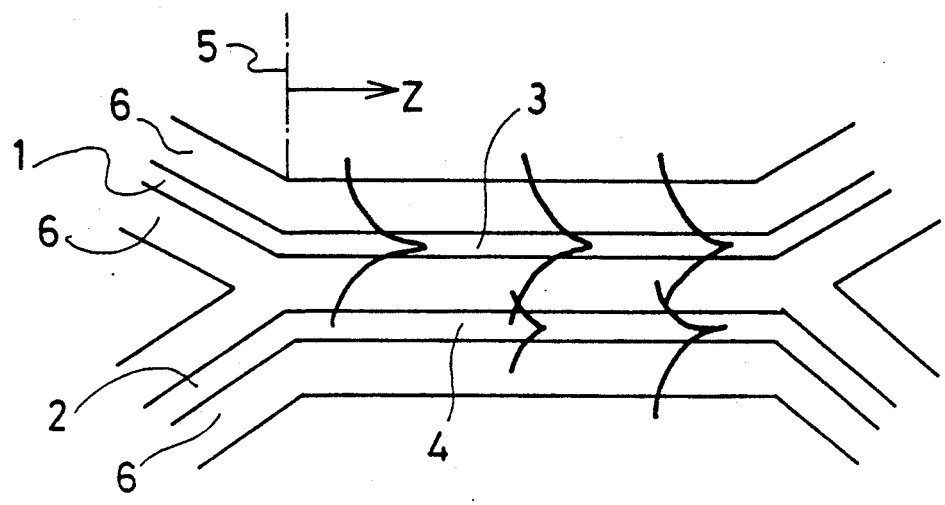
FIG. 1 is a diagrammatic illustration of an optical coupler according to the present invention.
Figure 2:
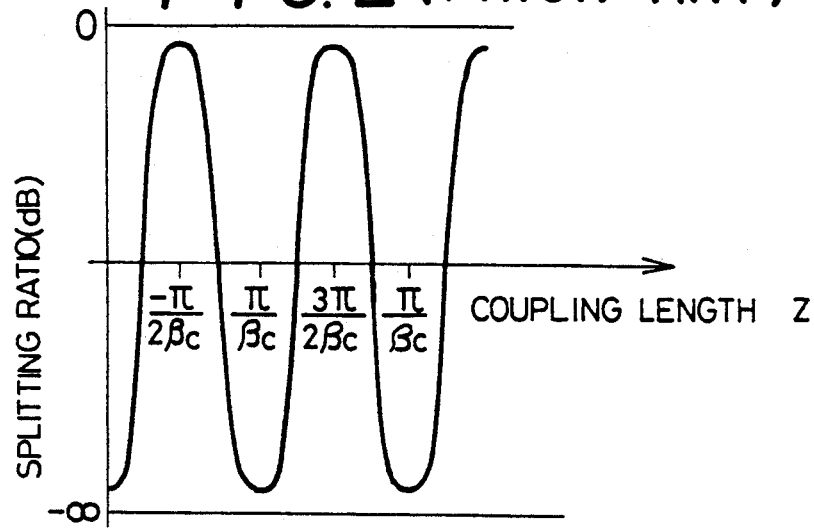
FIG. 2 shows the relationship between coupling length and splitting ratio in a conventional filter-coupler.
Figure 3:
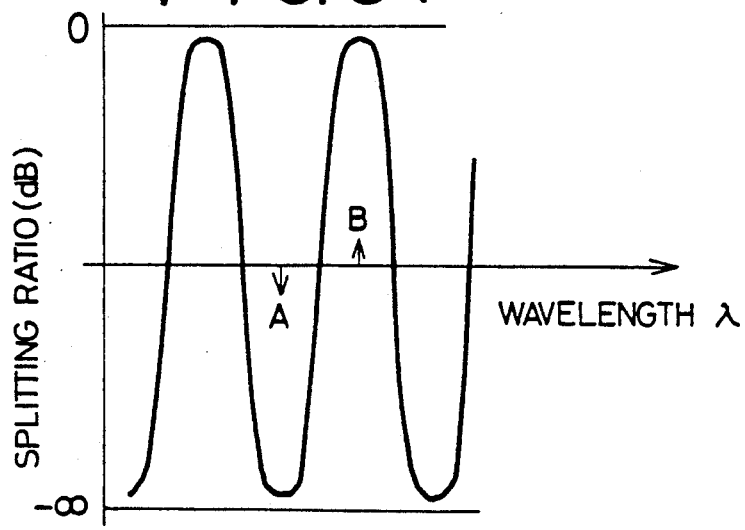
FIG. 3 shows the relationship between wavelength and splitting ratio in a conventional filter-coupler.

The present invention is hereunder described in detail with reference to the accompanying drawings. FIG. 1 is a diagrammatical figure showing an example of the optical coupler according to the invention using single-mode optical fiber, multi-mode optical fibers or other waveguides. Since the basic structure of any optical filter-coupler is the same as that of an optical filter-coupler using single-mode optical fibers, the description herein is made with reference only to an optical filter-coupler using single-mode optical fibers.

Figure 4:
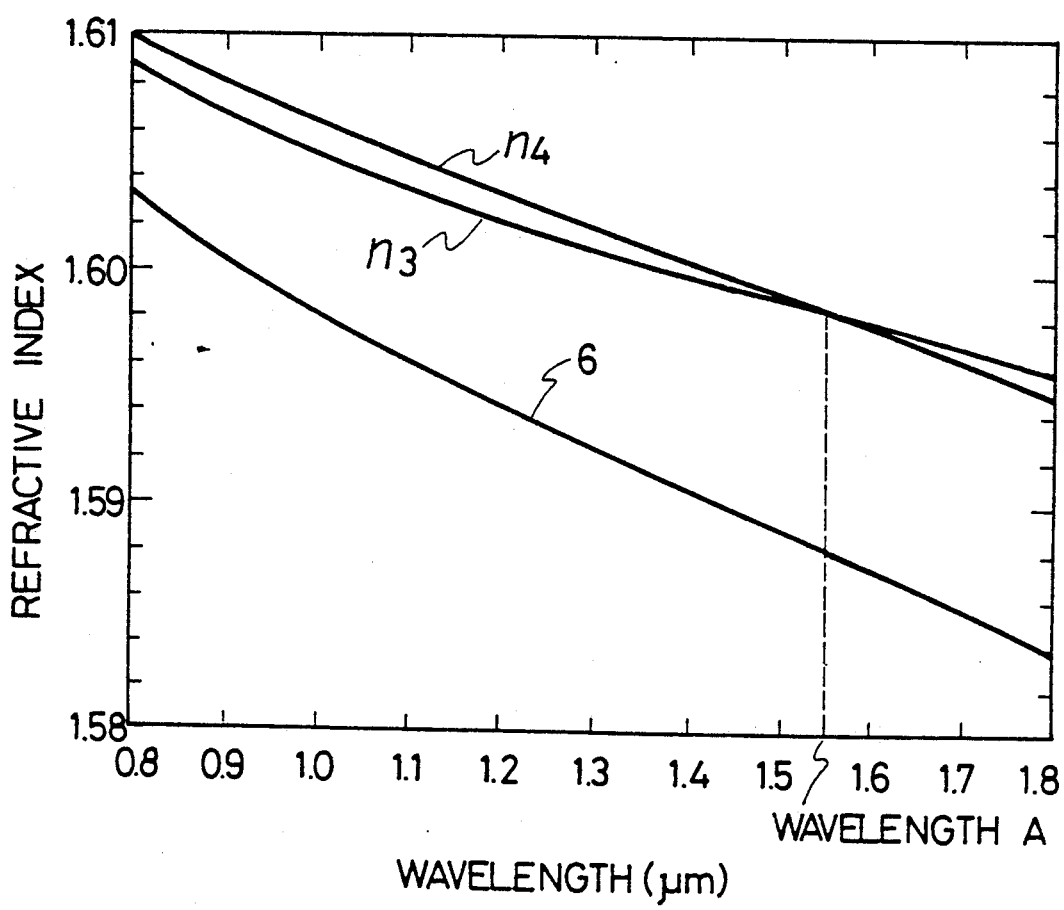
FIG. 4 shows the wavelength-dispersion of refractive indexes of materials used for the core and cladding according to the invention.
Figure 5:
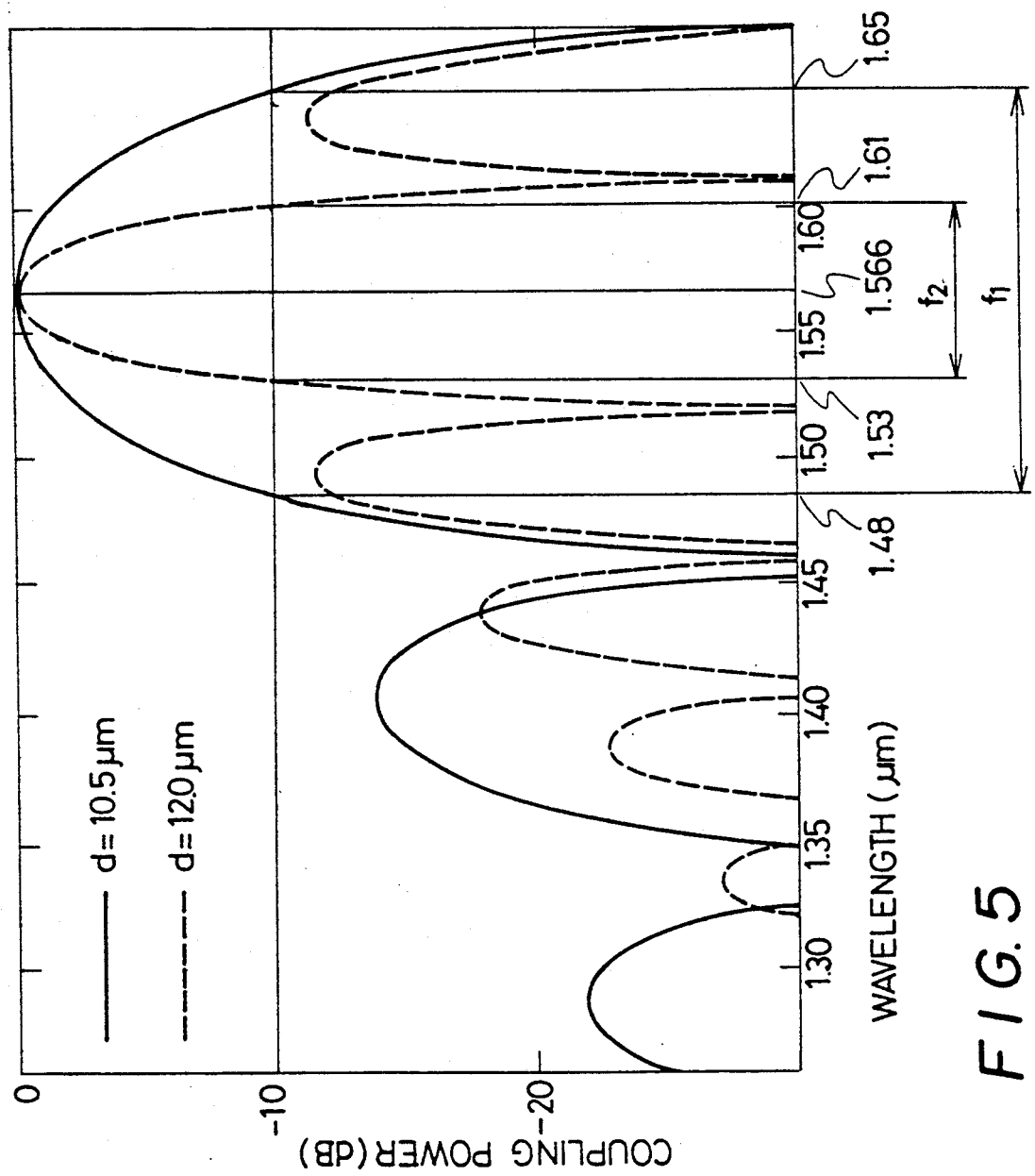
FIG. 5 shows the relationship between coupling power and wavelength in a filter-coupler according to the present invention.

A coupling region 5 is formed by either fusing or polishing and jointing parts of two single-mode optical fibers. The cores 3 and 4 of these two optical fibers are made of materials having different refractive indexes $n_3$ and $n_4$, as shown in FIG. 4. When light entering an incident port 1 propagates by a distance Z from the point 5 where coupling starts, the splitting ratio thereat is given as:

$$R = 10 \log \frac{C^2 \sin^2 \beta c Z}{\Delta^2 + (C \cos \beta c Z)^2}$$

where $\Delta = \pi/\lambda(n_3 - n_4)$, C is the coupling coefficient, $\beta c = \sqrt{C^2 + \Delta^2}$, and $\lambda$ is the wavelength of the light in vacuum. Therefore, when conditions are selected to give the maximum value of the above equation, namely, when the coupling length is selected to be an odd multiple of $\pi/2\beta c$, a splitting ratio of $10 \log C^2/\Delta^2$ is obtained. If materials having a common refractive index at the wavelength A and having different wavelength-dispersive refractive indexes (i.e., different chromatic refractive indexes) are selected, for example, BaCED1 of HOYA (a Japanese glass manufacturer) is used for a material having the refractive index $n_3$, PCD5 of HOYA for the material having the refractive index $n_4$ and ADF10 of HOYA for the cladding material 6, $\Delta$ becomes 0 at the wavelength A. However, in this case, the more a given wavelength of the propagating light shifts from the wavelength A, the more $\Delta$ becomes large. Further, when the coupling length Z is selected to be an odd multiple of $\pi/2\beta c$, a perfect power transfer from one of the cores 3 to the other core 4 takes place at the wavelength A, while the power transfer drastically diminishes as the wavelength of the propagating light shifts from the wavelength A. The above phenomenon is represented in FIG. 5. The solid line therein represents the characteristic obtained when the center-to-center separation between the two cores is 10.5 $\mu$m, and the broken line represents the characteristic obtained when the center-to-center separation is 12.0 $\mu$m. Assuming a wavelength filter to have the coupling power of 10 dB, when the center-to-center separation is 10.5 $\mu$m, this filter shall have a peak coupling power at a wavelength of 1.556 $\mu$m and a bandwidth of $f_1$ between 1.48 $\mu$m and 1.65 $\mu$m. When the center-to-center separation is 12.0 $\mu$m, this filter shall have a peak coupling power at wavelength of 1.556 $\mu$m and a bandwidth of $f_2$ between 1.53 $\mu$m and 1.61 $\mu$m.

Besides the glass materials used in the above embodiment, other combinations of materials which produce the same characteristics as described above can also be selected. Although single-mode optical fibers are used in the above embodiment, multi-mode optical fibers and other types of waveguides such as planar waveguides, etc. can also be used to produce the same characteristics as described in the foregoing.

Further, the peak coupling power which is defined by wavelength-dispersions of refractive indexes of glass materials can also be changed by using structural dispersions of the refractive indexes, for example, by using optical fibers of different diameters in the above-mentioned structure. Moreover, functionally different wavelength filters can be manufactured by combining three or four optical fibers.

According to the invention, the selection of wavelengths is easy, both the upper limit and the lower limit of a bandwidth can be adjusted by the center-to-center separation between waveguides, and the selection of wavelengths for peak coupling powers is easy, whereby wavelength filters of uniform quality can be produced at low cost, and the production yield is thus improved.

We claim:

1. An optical filter-coupler for coupling optical signals at a selected wavelength comprising:
   a first optical waveguide and a second optical waveguide having portions closely spaced apart in parallel with each other for allowing light propagating in one of said first and said second waveguides to couple into the other waveguide, wherein said first optical waveguide comprises a first material having a first chromatic refractive index, said second optical waveguide comprises a second material having a second chromatic refractive index which is different from said first chromatic refractive index, and said first material and said second material have a common refractive index at a selected wavelength.

2. An optical filter-coupler as defined in claim 1, wherein said first and second waveguides comprise single-mode optical fibers.

3. An optical filter-coupler as defined in claim 1, wherein said first and second waveguides comprise multi-mode optical fibers.

4. An optical filter-coupler as defined in claim 1, wherein said first and second waveguides include a fused coupling region effective to allow light to propagate therebetween.

5. An optical filter-coupler as defined in claim 1, wherein said first and second waveguides include a polished and joined coupling region effective to allow light to propagate therebetween.

6. An optical filter-coupler as defined in claim 1, wherein the parallel portions of the first and second optical waveguides are spaced apart from each other a predetermined distance effective to set the bandwidth of light propagating therebetween.

7. An optical wavelength-selective coupler comprising: first and second optical waveguides optically coupled to one another to enable optical radiation propagating in one optical waveguide to couple into and propagate in the other optical waveguide, the first optical waveguide being composed of a first material having a first refractive index characteristic that varies with wavelength, the second optical waveguide being composed of a second material having a second refractive index characteristic that varies with wavelength, and the first and second refractive index characteristics being different from each other over a given spectrum of wavelengths except for a narrow range of wavelengths within which the first and second refractive index characteristics are substantially the same.

8. An optical wavelength-selective coupler according to claim 7; wherein the first and second optical waveguides have respective longitudinal center axes, the two center axes having parallel portions and being spaced apart from each other along the parallel portions a preselected distance effective to set the bandwidth of propagating radiation that couples from one optical waveguide into the other optical waveguide.

9. An optical wavelength-selective coupler according to claim 8; wherein the preselected distance is in the range 10.5 to 12.0 μm.

10. An optical wavelength-selective coupler according to claim 7; wherein the first and second optical waveguides comprise optical fibers.

11. An optical wavelength-selective coupler according to claim 10; wherein the optical fibers comprise single-mode optical fibers.

12. An optical wavelength-selective coupler according to claim 10; wherein the optical fibers comprise multi-mode optical fibers.

13. An optical wavelength-selective coupler according to claim 10; wherein the optical fibers have cores comprised of the respective first and second materials.

14. An optical wavelength-selective coupler according to claim 13; wherein the cores are covered by a cladding material.

15. An optical wavelength-selective coupler according to claim 14; wherein the cladding material has a refractive index characteristic different from the first and second refractive index characteristics.

16. An optical wavelength-selective coupler according to claim 15; wherein the refractive index characteristic of the cladding material varies with wavelength.

17. An optical wavelength-selective coupler according to claim 7; wherein the first and second optical waveguides have a coupling region in which the waveguides are optically coupled together, the waveguides extending parallel to one another in the coupling region.

18. An optical wavelength-selective coupler according to claim 17; wherein the first and second optical waveguides are fused together in the coupling region.

19. An optical wavelength-selective coupler according to claim 17; wherein the first and second optical waveguides have polished surfaces in the coupling region.

* * * * *